(12) United States Patent
Uchino et al.

(10) Patent No.: US 7,897,899 B2
(45) Date of Patent: Mar. 1, 2011

(54) METHOD AND APPARATUS FOR DRIVING A LIQUID LENS

(75) Inventors: Osamu Uchino, Chigasaki (JP); Hiroaki Kohriyama, Yokohama (JP); Yoshinobu Yamamoto, Fujisawa (JP)

(73) Assignee: Texas Instruments Incorporated, Dallas, TX (US)

( * ) Notice: Subject to any disclaimer, the term of this patent is extended or adjusted under 35 U.S.C. 154(b) by 220 days.

(21) Appl. No.: 12/193,410

(22) Filed: Aug. 18, 2008

(65) Prior Publication Data
US 2009/0302197 A1    Dec. 10, 2009

(30) Foreign Application Priority Data
Aug. 16, 2007 (JP) ................. 2007-212284

(51) Int. Cl.
*G02B 7/04* (2006.01)
(52) U.S. Cl. ..................................... 250/201.2; 250/216
(58) Field of Classification Search ............... 250/208.1, 250/201.2–201.5, 216, 214 R; 359/665–676, 359/291, 599; 349/200, 149, 33; 396/75–77, 396/133
See application file for complete search history.

(56) References Cited

U.S. PATENT DOCUMENTS
7,532,303 B2 *    5/2009    Kato et al. .................... 349/200

* cited by examiner

*Primary Examiner* — Que T Le
(74) *Attorney, Agent, or Firm* — John J. Patti; Wade J. Brady, III; Frederick J. Telecky, Jr.

(57) ABSTRACT

A liquid lens driver 10 has DC-DC converter 12, oscillator 14, pulse width modulator 16, and control logic circuit 18. The output buffer circuit 30 divides converter output voltage $V_s$ of a prescribed amplitude (voltage level), input as the power source voltage, into bipolar, that is, positive/negative, output voltages Out-A, Out-B for output, and, corresponding to the H/L level of PWM signal $C_{PWM}$, it turns ON/OFF the two output voltages Out-A, Out-B. In this way, from liquid lens driver 10, pulse width modulation (PWM) output voltages Out-A, Out-B are applied as driving voltage $V_L$ on electrodes 104, 108 of liquid lens 100.

19 Claims, 4 Drawing Sheets

METHOD AND APPARATUS FOR DRIVING A LIQUID LENS

FIELD OF THE INVENTION

The present invention pertains to an image pickup method and image pickup device using a liquid lens. Especially, the present invention pertains to a method and circuit for driving the liquid lens.

BACKGROUND OF THE INVENTION

Recently, attention has been focused on liquid lenses as optical members for the autofocus function of cell phones with built-in cameras. As described in Nikkei Electronics, Oct. 24, 2005, pp. 129-134, "Non-mechanical member Amazing liquid lens near mass production stage", a liquid lens has the following constitution: in a lens holder, two types of liquids, that is, an electroconductive aqueous solution and a nonconductive oil, are sealed; corresponding to the magnitude of the voltage applied on the aqueous solution, the shape of the interface between the aqueous solution and the oil is adjusted to realize a desired refractivity. By using a liquid lens as an image pickup lens, space for mechanically moving the lens position along the optical axis is not required, and the use of a motor or another actuator or movable member is not required, so the size and cost of the autofocus mechanism can be reduced.

FIG. 4 is a diagram illustrating the basic constitution of a liquid lens and the circuit constitution of a liquid lens driver in the prior art. For this liquid lens 100, lens holder 102 comprises a cylindrical or side wall portion of a three-layer structure consisting of upper metal electrode 104, insulator 106, and lower metal electrode 108, each in a ring shape, as well as upper transparent plate (window) 110 and lower transparent plate (window) 112. In lens holder 102, electroconductive aqueous solution 114 is sealed in the upper half, and insulating oil 116 is sealed in the lower half. The inner wall surface of said lower metal electrode 108 is tapered downward toward the center. Said insulator 106 covers the entirety of the inner wall surface of lower metal electrode 108, and it electrically insulates not only lower metal electrode 108 from upper metal electrode 104, but also from aqueous solution 114 and oil 116.

For liquid lens 100 with said constitution, when no voltage is applied between upper metal electrode 104 and lower metal electrode 108, the interface between aqueous solution 114 and oil 116 is almost flat. Then, when driving voltage $V_L$ (Out-P, Out-M) is applied from liquid lens driver 120 between two electrodes 104, 108, aqueous solution 114 is pulled toward lower metal electrode 108, so that oil 116 near the inner wall surface (slope) of lower metal electrode 108 is pressed out, and the pressed-out oil 116 is pulled toward the center. As a result, the interface between the two portions becomes curved, so the refractivity of liquid lens 100 for the light transmitted through it changes. By changing the magnitude of driving voltage $V_L$ (Out-P, Out-M), it is possible to control the curve shape or curvature of the interface, and it is possible to change the refractivity or focal distance.

Said liquid lens driver 120 has DC-DC converter 122, which converts prescribed DC voltage $V_{DD}$ input from a DC power source (not shown in the figure) to desired DC voltage $V_s$, oscillator 124, which oscillates and outputs a square-wave frequency signal or pulse signal CK, digital/analog converter (DAC) 126 for amplitude modulation, and control logic circuit 128 that controls said parts 122, 124, 126. Said DC-DC converter 122 is of the chopper system booster type having a switching element (not shown in the figure). During the ON period of the switching element, energy is accumulated in inductor 130, and, during the OFF period of the switching element, the energy is released from inductor 130 via diode 132 to the side of output capacitor 134.

Two resistors 136, 138 that are set parallel to output capacitor 134 to form a resistor voltage dividing circuit are connected in series. The connecting point or node N between the two resistors is connected to the input terminal of a feedback controller (not shown in the figure) in DC-DC converter 122, and, at the same time, it is connected to the output terminal of DAC 126. DAC 126 converts digital control signal $V_F$ input from control logic circuit 128 to analog control voltage $V_f$ that is sent to node N. The potential at node N is changed by means of output voltage $V_f$ of DAC 126, so converter output voltage $V_s$ can be adjusted within a prescribed range (e.g., 10-60 V).

The two terminals of capacitor 134 are connected to the power source voltage input terminals of full bridge type output buffer circuit 140. Pulse signal CK at a prescribed frequency and having a prescribed waveform (prescribed ON/OFF time ratio) is supplied from oscillator 124 to the signal input terminal of output buffer circuit 140. Said output buffer circuit 140 divides converter output voltage $V_s$, input as the power source voltage, into bipolar, that is, positive/negative, output voltages Out-P, Out-M for output, and, corresponding to the H/L level of pulse signal CK, it turns ON/OFF said two output voltages Out-P, Out-M. In this way, from liquid lens driver 120, pulse amplitude modulation (PAM) output voltages Out-P, Out-M are applied as driving voltage $V_L$ on electrodes 104, 108 of liquid lens 100.

With said liquid lens driver 120, the amplitude of converter output voltage $V_s$ and thus the amplitude of driving voltage $V_L$ (Out-P, Out-M) are adjusted by means of output voltage $V_f$ of DAC 126, so that the refractivity of liquid lens 100 can be changed.

As explained above, in the liquid lens driving system in the prior art, liquid lens driver 120 with the constitution shown in FIG. 4 is used. By changing output voltage $V_f$ of DAC 126 under control of control logic circuit 128, the amplitude of driving voltage $V_L$ (Out-P, Out-M) is changed as shown in FIG. 5, and the refractivity of liquid lens 100 can be changed.

However, for the liquid lens driving system, improvement still should be made on power consumption and response speed. That is, when said driving voltage $V_L$ (Out-P, Out-M) is changed from, e.g., 60 V to 30 V, output voltage $V_f$ of DAC 126 falls to a prescribed value, capacitor discharge current is retrieved from the positive side terminal of capacitor 134 via resistor 136 to DAC 126, and converter output voltage $V_s$ falls. In this case, if the resistance of resistor 136 is high, the discharge is slower, and the response speed, that is, the focusing speed, decreases. On the contrary, if the resistance of resistor 136 is selected to be smaller, the response speed is improved, while the power consumption rises. That is, in this case, while a rated voltage (60 V) is output to DC-DC converter 122, electric power is consumed by the resistors 136, 138 of voltage dividing resistor circuits, and the output falls to 30 V. Consequently, the power feeding efficiency falls. Also, even if DC-DC converter 122 can perform a high-speed feedback operation, setting the feedback constant is difficult, and the control of change in the output voltage (transient response) tends to be unstable.

In addition, because the output voltage of liquid lens driver 120, that is, driving voltage $V_L$ (Out-P, Out-M), depends on output buffer circuit 140, the desired dynamic range cannot be obtained. Also, because the voltage amplitude can be adjusted in analog format, it is likely to be influenced by the temperature characteristics. This is also undesired.

A general object of the present invention is to solve the aforementioned problems of the prior art by providing a liquid lens driving method, liquid lens driver, as well as an image pickup method and image pickup device using a liquid lens, characterized by the fact that it can realize higher speed, higher precision, higher efficiency and higher stability in driving of the liquid lens and to improve the autofocus function in an image pickup method and image pickup device using a liquid lens.

SUMMARY OF THE INVENTION

These and other objects and features are provided in accordance with an aspect of the present invention by a liquid lens driving method and a type of liquid lens driver characterized by the fact that a driving voltage in pulse waveform is applied on a liquid lens, and, by adjusting the ON/OFF time ratio of the pulse waveform, the effective value of said driving voltage is controlled to control the refractivity of said liquid lens for light passing through it.

According to an aspect of the liquid lens driving method and liquid lens driver of the present invention, by changing the ON/OFF time ratio of the driving voltage with a pulse waveform applied on the liquid lens, the effective value of the driving voltage is logically controlled to change. Consequently, compared to a system in which the amplitude of the driving voltage with a pulse waveform is controlled to change in analog format, when the refractivity of the liquid lens is controlled, the transient response characteristics, precision, and stability are excellent, the electric power efficiency is increased, and the circuit scale can be reduced.

The present invention may have, the ON/OFF time ratio of the pulse waveform of said driving voltage adjusted while the frequency is kept constant according to a pulse width control system, or the frequency is changed according to a pulse frequency control system to change the ON/OFF time ratio of the pulse waveform of the driving voltage. The driving voltage may have any pulse waveform, and may use a square waveform.

The driver of the present invention, may supply a driving signal to the liquid lens, with the focal distance changed corresponding to the applied voltage. The driver has a voltage generator that generates a voltage of a prescribed amplitude, a pulse width modulation signal generator that generates a pulse width modulation signal, and a buffer circuit that receives said voltage with a prescribed amplitude as the power source voltage and, in response to said pulse width modulation signal, feeds a pulse width modulated driving signal to the liquid lens. In this case, as a preferable scheme, the system also has an image pickup element that receives the light transmitted through said liquid lens, and a controller that controls the pulse width of said pulse width modulation signal based on the image pickup signal output from said image pickup element.

Also, an aspect of the present invention provides an image pickup method using a liquid lens characterized by the following facts: in the image pickup method, a desired optical image of the object is formed on the light receiving plane of an image pickup element by means of an optical system containing a liquid lens, and said optical image is converted to an electric signal by said image pickup element; in this image pickup method, by applying a driving voltage in pulse waveform on said liquid lens, the ON/OFF time ratio of the pulse waveform is changed to control the effective value of said driving voltage and to control the refractivity of said liquid lens for the light passing through it.

Also, an aspect of the present invention provides a type of image pickup device using a liquid lens characterized by the fact that it has the following parts: an image pickup element, a liquid lens that retrieves the light rays from an object to form a desired optical image of the object on the light receiving plane of said image pickup element, a solid lens set between said liquid lens and the light receiving plane of said image pickup element for forming the optical image of said object on the light receiving plane of said image pickup element, the liquid lens driver of the present invention that supplies a driving voltage to said liquid lens, and an image processor that controls the output voltage of said liquid lens driver so that the focal point of said optical system is focused on said object by means of image processing based on the output signal of said image pickup element.

With the image pickup method and image pickup device using the liquid lens of the present invention, while the operation and effect of the liquid lens driver of the present invention can be displayed, it is possible to improve the autofocus function.

REFERENCE NUMERALS AND SYMBOLS AS SHOWN IN THE DRAWINGS

In the figures, 10 represents a liquid lens driver, 12 represents a DC-DC converter, 14 represents an oscillator, 16 represents a pulse width modulator, 18 represents a control logic circuit, 30 represents an output buffer circuit, 100 represents a liquid lens, 104 represents an upper metal electrode, 106 represents an insulator, 108 represents a lower metal electrode, 114 represents an aqueous solution, and 116 represents oil.

DESCRIPTION OF THE EMBODIMENTS

According to an aspect of the liquid lens driving method, liquid lens driver as well as the image pickup method and image pickup device using the liquid lens of the present invention with said constitution and operation, it is possible to realize higher speed, higher precision, higher efficiency and higher stability in driving the liquid lens. Also, in the image pickup method and image pickup device of the present invention, the autofocus function also can be improved.

In the following, an explanation will be given regarding embodiments of the present invention with reference to FIGS. 1-3.

Figure 1:
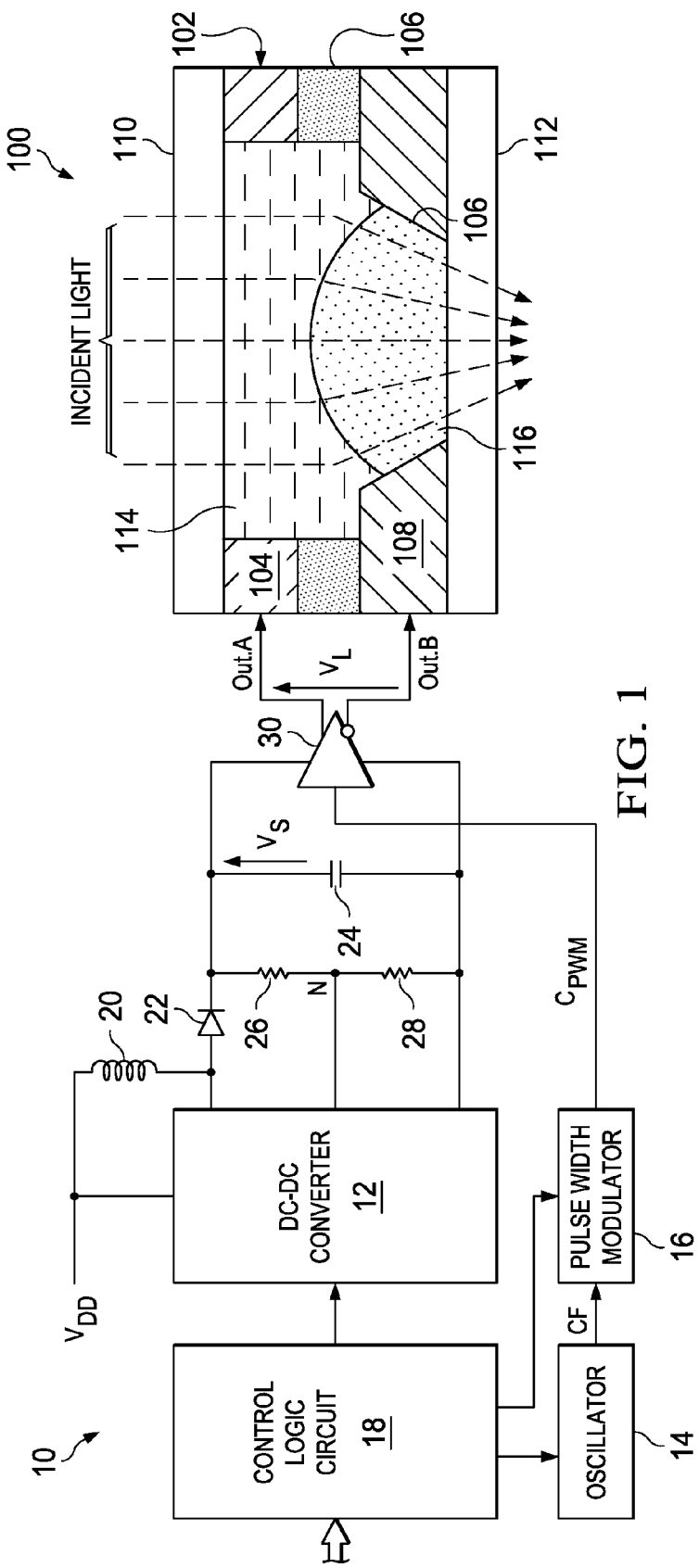
FIG. 1 is a diagram illustrating the circuit constitution of the liquid lens driver and the constitution of a typical liquid lens in an embodiment of the present invention.
Figure 4:
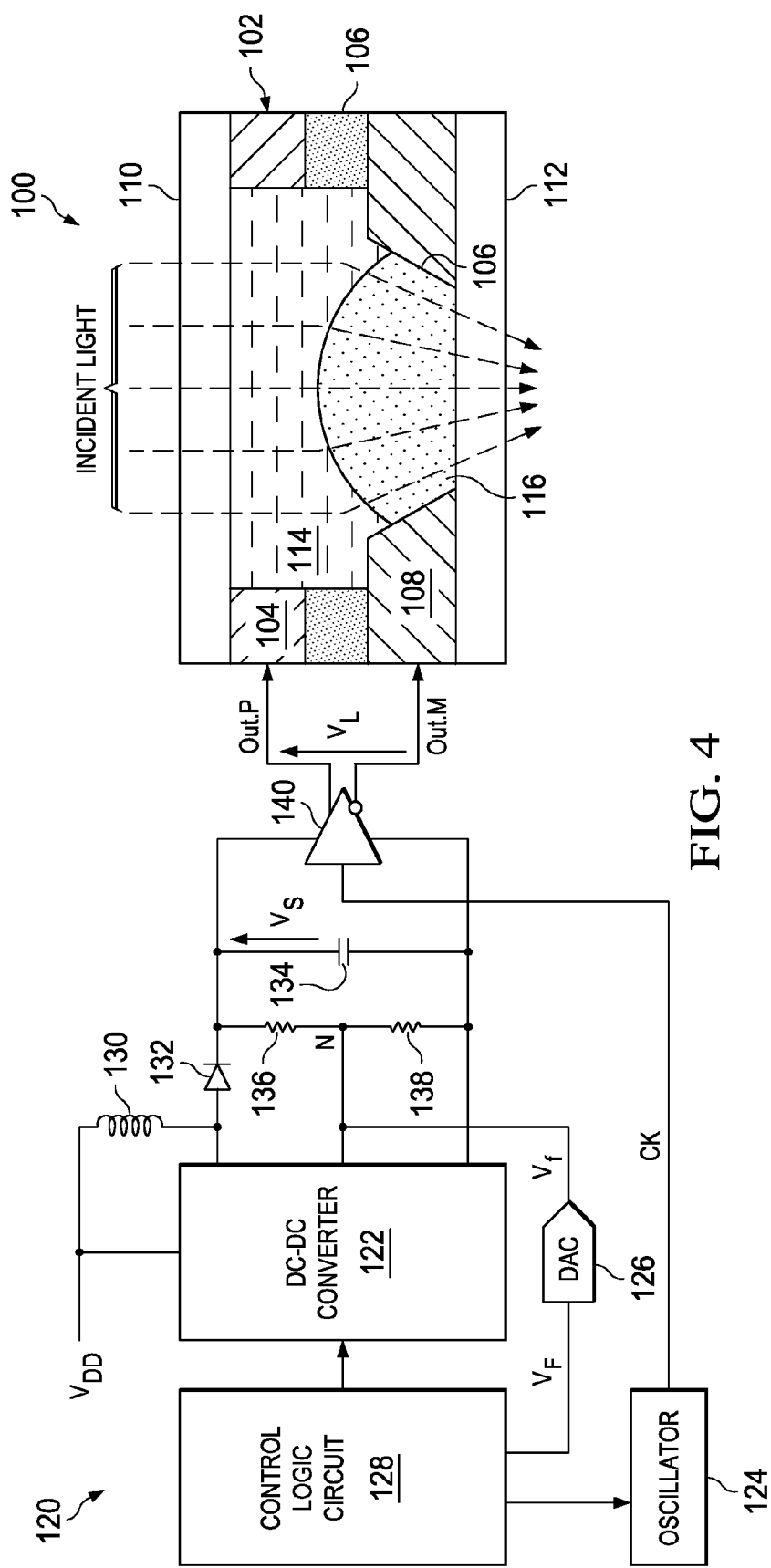
FIG. 4 is a diagram illustrating the circuit constitution of a liquid lens driver in the prior art.
Figure 5:
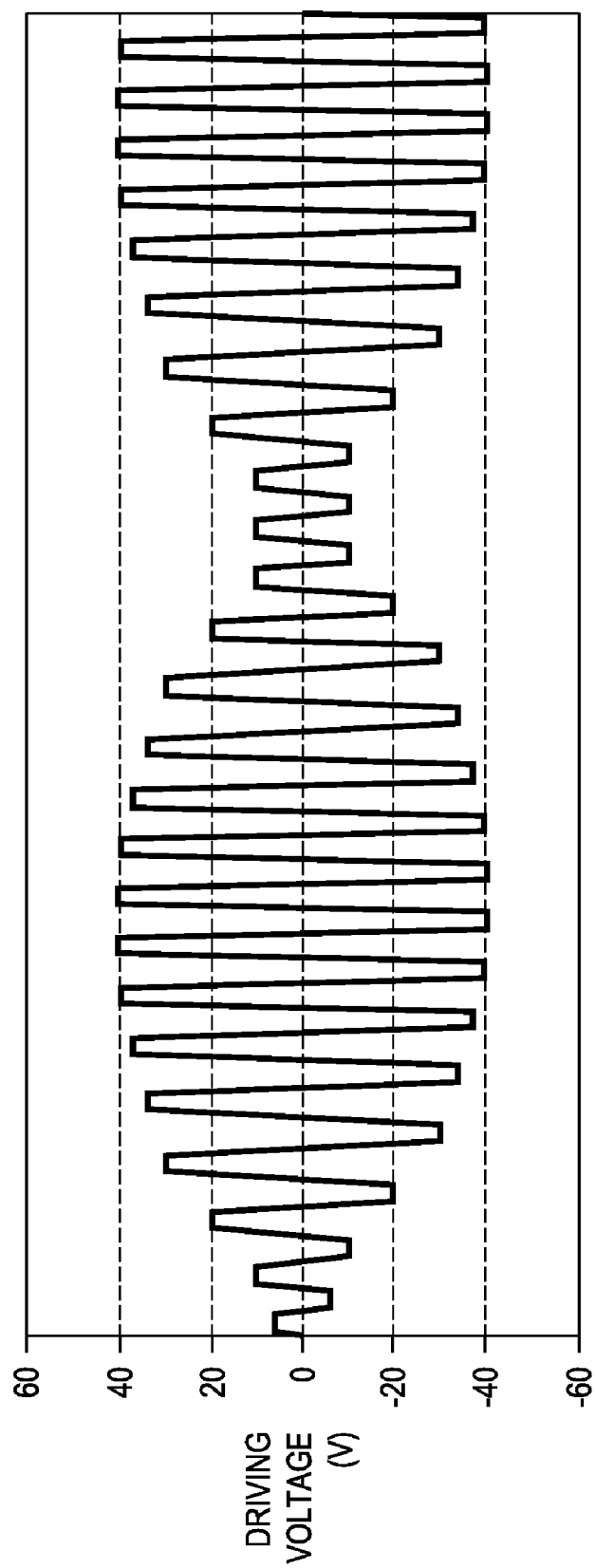
FIG. 5 is a diagram illustrating the voltage waveform in an example of the driving voltage obtained with the liquid lens driver shown in FIG. 4.

FIG. 1 is a diagram illustrating the circuit constitution of the liquid lens driver in an embodiment of the present invention. In this figure, liquid lens 100 has the same constitution as liquid lens 100 shown in FIG. 4.

In this embodiment, liquid lens driver 10 has DC-DC converter 12, which converts prescribed DC voltage $V_{DD}$ input from a DC power source (not shown in the figure) into a prescribed output voltage $V_s$, oscillator 14 that oscillates and outputs frequency signal CF in, e.g., a sawtooth (triangular) waveform, pulse width modulator 16, and control logic circuit 18 that controls said parts 12, 14, 16. Said DC-DC converter 12 is of the chopper system booster type having a switching element (not shown in the figure). During the ON period of the switching element, energy is accumulated in inductor 20, and, during the OFF period of the switching element, the energy is released from inductor 20 via diode 22 to the side of output capacitor 24.

Two resistors 26, 28 that are set parallel to output capacitor 24 to form a resistor voltage dividing circuit are connected in series. The connecting point or node N between the two resistors is connected to the input terminal of a feedback controller (not shown in the figure) in DC-DC converter 12. A nonvarying control signal is applied on node N. Said DC-DC converter 12 performs a boosting operation under constant voltage feedback control so that converter output voltage $V_s$ is kept at a constant value (e.p., 60 V).

In order to minimize the current flowing in said resistor voltage dividing circuit 26, 28, and hence the electric power consumed there, the resistance values of said two resistors 26, 28 may be selected sufficiently high.

The two terminals of capacitor 24 are connected to the power source voltage input terminals of full bridge type output buffer circuit 30. Pulse width modulation signal (PWM) $C_{PWM}$ with a variable duty ratio (ON/OFF time ratio) at a prescribed frequency is supplied from pulse width modulator 16 to an input terminal of output buffer circuit 30. Here, said pulse width modulator 16 has a voltage generator that generates a variable modulation voltage under control of, e.g., control logic circuit 18, and a comparator, which compares sawtooth signal CF from oscillator 14 and said modulation voltage, and, corresponding to the relationship between the instantaneous voltage values of the two voltages, generates a pulse width variable pulse signal that takes two amplitude values, H level and L level. The pulse width variable pulse signal obtained by the comparator is output as PWM signal $C_{PWM}$.

Said output buffer circuit 30 divides converter output voltage $V_s$ with a prescribed amplitude (voltage level), input as the power source voltage, into bipolar, that is, positive/negative, output voltages Out-A, Out-B for output, and, corresponding to the H/L level of PWM signal $C_{PWM}$, it turns ON/OFF said two output voltages Out-A, Out-B. In this way, from liquid lens driver 10, pulse width modulation (PWM) output voltages Out-A, Out-B are applied as driving voltage $V_L$ on electrodes 104, 108 of liquid lens 100.

Figure 2:
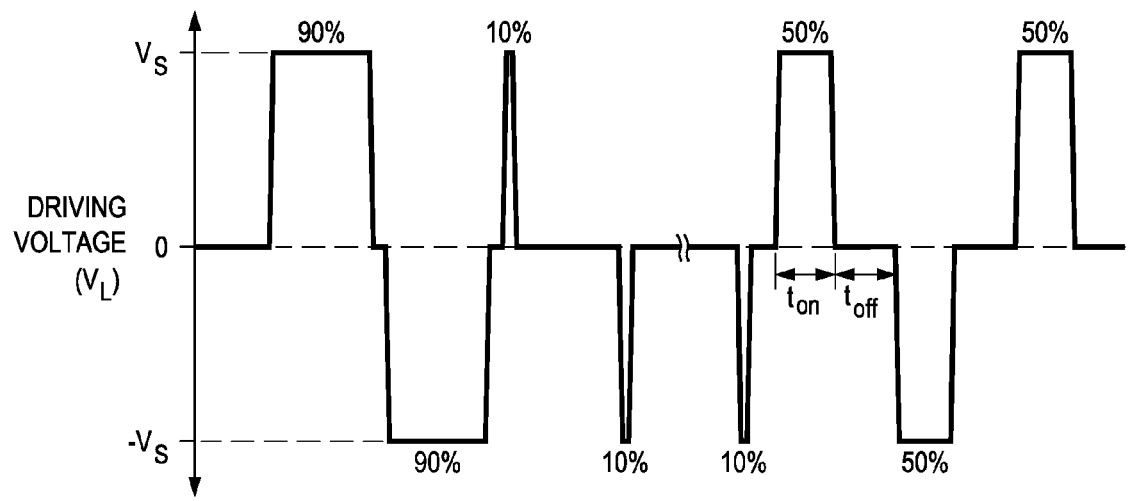
FIG. 2 is diagram illustrating the voltage waveform in an example of the driving voltage obtained using the liquid lens driver in the embodiment.

FIG. 2 is a diagram illustrating an example of the waveform of driving voltage $V_L$ (Out-A, Out-B) applied from liquid lens driver 10 on electrodes 104, 108 of liquid lens 100. By changing the ratio of ON time $t_{on}$ to OFF time $t_{off}$ in each period, or the duty ratio $d\{t_{on}/(t_{on}+t_{off})\}$, it is easy to change the effective value of driving voltage $V_L$ (Out-A, Out-B) as desired.

As explained above, for liquid lens driver 10 in this embodiment, converter output voltage $V_s$ with a prescribed amplitude (voltage level) is pulse width modulated so that the ON/OFF time ratio or duty ratio can be changed logically under control. Consequently, wasteful consumption of electric power due to a resistor circuit is not necessary in changing the driving voltage (effective value), and it is also possible to improve the response speed and the transient response characteristics. Also, for a system in which the effective value of driving voltage $V_L$ (Out-A, Out-B) is adjusted under control by means of a logic circuit, it is possible to improve the precision of the driving voltage and hence the precision in control of the refractivity of the liquid lens, so that the system has a high resistance against variation in environment temperature and against dispersion in the manufacturing process. This is also an advantage. In addition, since DAC 126 is not needed, the circuit constitution and circuit scale can be simplified and downsized.

Figure 3:
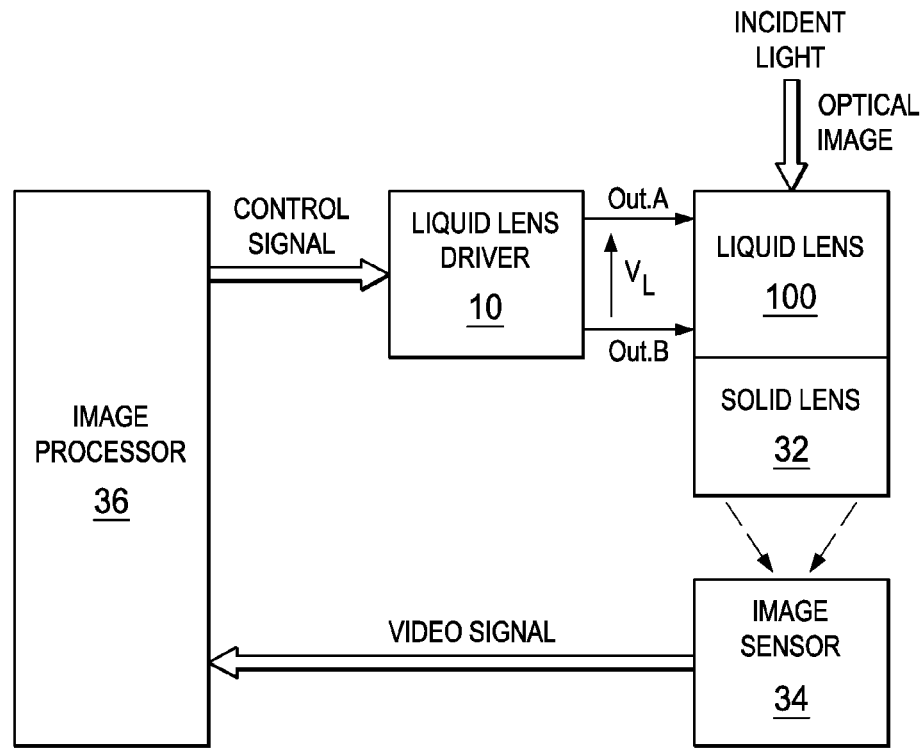
FIG. 3 is a block diagram illustrating the constitution of the image pickup device in the embodiment.

FIG. 3 is a block diagram illustrating the constitution of an image pickup device in an embodiment containing said liquid lens driver 10 and said liquid lens 100. In this image pickup device, solid lens 32 is set in combination with liquid lens 100 set directly ahead of it (in the front section). The incident light (optical image) for the object is focused on the light receiving plane of image sensor (image pickup element) 34. For example, image sensor 34 may be made of a CCD or MOS type image pickup element, and it photoelectrically converts the received optical image to generate a formatted video signal.

For example, image processor 36 consists of, for example, a DSP (Digital Signal Processor), and performs the image processing for displaying the picked up image on a display (not shown in the figure) based on the video signal retrieved from image sensor 34. In addition, feedback control for autofocus is performed, and a closed loop comprising liquid lens driver 10, liquid lens 100 and image sensor 34 is controlled so that the contour of the image becomes sharpest by means of edge detection. Consequently, corresponding to a control signal from image processor 36, liquid lens driver 10, especially control logic circuit 18 (FIG. 1), controls the modulation degree or the duty ratio of PWM in pulse width modulator 16.

Said image pickup device has liquid lens driver 10 in the embodiment, so it is possible to improve the autofocus function (especially the transient response characteristics), and it is possible to realize a smaller size, smaller assembly area, lower power consumption, and lower cost of the circuit constitution of the overall device. Consequently, it can be adopted favorably in the application of cell phones.

In the above, an explanation was provided on a preferable embodiment of the present invention. However, the present invention is not limited to said embodiment. For specialists, various modifications and changes can be made in accordance with the spirit and scope of the attached claims.

For example, DC-DC converter 12 in liquid lens driver 10 in said embodiment may be replaced by any other converter system or circuit constitution as a modification.

In said embodiment, in order to control change in the effective value of said driving voltage $V_L$ (Out-A, Out-B), the pulse width modulation (PWM) system is adopted by changing the ON/OFF time ratio (duty ratio) of the pulse waveform of driving voltage $V_L$ (Out-A, Out-B) at a constant frequency. However, instead of said pulse width modulation (PWM) system, one may also adopt a pulse frequency control system (PFM) in which the frequency is changed in order to change the ON/OFF time ratio of the pulse waveform of driving voltage $V_L$ (Out-A, Out-B). In this case, pulse width modulator 16 (FIG. 1) may be replaced by a pulse frequency modulator.

As another modified example, although the circuit scale and cost may rise, one may also adopt a combination of a pulse width modulation (PWM) system and a pulse frequency modulation (PFM) system, or a combination of a pulse width modulation (PWM) system and a pulse amplitude modulation (PAM) system.

Also, the pulse waveform of said driving voltage $V_L$ (Out-A, Out-B) is not limited to a square waveform. For example, one may also adopt a trapezoidal waveform or sawtooth waveform or another pulse waveform.

The invention claimed is:

1. A liquid lens driving method comprising:
   applying a driving voltage in pulse waveform to a liquid lens;
   adjusting the ON/OFF time ratio of the pulse waveform, to control the effective value of said driving voltage to control the refractivity of said liquid lens for light passing through it.

2. The liquid lens driving method described in claim 1, wherein the ON/OFF time ratio of the pulse waveform of said driving voltage is adjusted while the frequency is kept constant according to a pulse width control system.

3. The liquid lens driving method described in claim 1, wherein the frequency is changed according to a pulse frequency control system to change the ON/OFF time ratio of the pulse waveform of the driving voltage.

4. The liquid lens driving method described in claim 1, wherein that the pulse waveform of said driving voltage is a square waveform.

5. An image pickup method comprising:
   forming a desired optical image of an object on the light receiving plane of an image pickup element by means of an optical system containing a liquid lens;
   and converting said optical image to an electric signal by said image pickup element by applying a driving voltage in pulse waveform on said liquid lens, the ON/OFF time ratio of the pulse waveform being changed to control the effective value of said driving voltage and to control the refractivity of said liquid lens for the light passing through it.

6. A type of liquid lens driver comprising:
   a driver having a driving voltage in pulse waveform applied on a liquid lens; and
   the ON/OFF time ratio of the pulse waveform is changed to control the effective value of said driving voltage to control the refractivity of the liquid lens for the light passing through it.

7. The liquid lens driver described in claim 6, wherein, according to a pulse width control system, while the frequency is kept constant, the ON/OFF time ratio of the pulse waveform of said driving voltage is changed.

8. The liquid lens driver described in claim 6, wherein, according to a pulse frequency control system, the ON/OFF time ratio of the pulse waveform of said driving voltage is changed.

9. The liquid lens driver described in claim 6, wherein the pulse waveform of said driving voltage is a square waveform.

10. An image pickup device comprising:
    an image pickup element;
    a liquid lens that retrieves the light rays from an object to form a desired optical image of an object on the light receiving plane of said image pickup element;
    a solid lens between said liquid lens and the light receiving plane of said image pickup element for forming the optical image of said object on the light receiving plane of said image pickup element;
    the liquid lens driver described in claim 6 that supplies a driving voltage to said liquid lens; and
    an image processor that controls the output voltage of said liquid lens driver so that the focal point of said optical system is focused on said object by means of image processing based on the output signal of said image pickup element.

11. The liquid lens driving described in claim 6, which supplies a driving signal to a liquid lens to change the focal distance corresponding to the applied voltage, comprises:
    a buffer circuit, which receives said voltage with the prescribed amplitude as the power source voltage, and which supplies a driving signal pulse modulated corresponding to said pulse width modulation signal.

12. The driver described in claim 11, further comprising
    an image pickup element that receives light transmitted through said liquid lens; and
    a controller that controls the pulse width of said pulse width modulation signal based on an image pickup signal output from said image pickup element.

13. The liquid lens driving method described in claim 2, wherein that the pulse waveform of said driving voltage is a square waveform.

14. The liquid lens driving method described in claim 3, wherein that the pulse waveform of said driving voltage is a square waveform.

15. The liquid lens driver described in claim 7, wherein the pulse waveform of said driving voltage is a square waveform.

16. The liquid lens driver described in claim 8, wherein the pulse waveform of said driving voltage is a square waveform.

17. An image pickup device comprising:
    an image pickup element;
    a liquid lens that retrieves the light rays from an object to form a desired optical image of an object on the light receiving plane of said image pickup element,
    a solid lens between said liquid lens and the light receiving plane of said image pickup element for forming the optical image of said object on the light receiving plane of said image pickup element;
    the liquid lens driver described in claim 7 that supplies a driving voltage to said liquid lens; and
    an image processor that controls the output voltage of said liquid lens driver so that the focal point of said optical system is focused on said object by means of image processing based on the output signal of said image pickup element.

18. An image pickup device comprising:
    an image pickup element;
    a liquid lens that retrieves the light rays from an object to form a desired optical image of an object on the light receiving plane of said image pickup element,
    a solid lens between said liquid lens and the light receiving plane of said image pickup element for forming the optical image of said object on the light receiving plane of said image pickup element;
    the liquid lens driver described in claim 8 that supplies a driving voltage to said liquid lens; and
    an image processor that controls the output voltage of said liquid lens driver so that the focal point of said optical system is focused on said object by means of image processing based on the output signal of said image pickup element.

19. An image pickup device comprising:
    an image pickup element;
    a liquid lens that retrieves the light rays from an object to form a desired optical image of an object on the light receiving plane of said image pickup element,
    a solid lens between said liquid lens and the light receiving plane of said image pickup element for forming the optical image of said object on the light receiving plane of said image pickup element;

the liquid lens driver described in claim 9 that supplies a driving voltage to said liquid lens; and an image processor that controls the output voltage of said liquid lens driver so that the focal point of said optical system is focused on said object by means of image processing based on the output signal of said image pickup element.

* * * * *